(12) United States Patent
Hillen et al.

(10) Patent No.: US 12,185,668 B2
(45) Date of Patent: Jan. 7, 2025

(54) REMOTE AND AUTOMATIC CONNECTION AND DRIVE OF A COMBINE HEADER

(71) Applicant: CNH Industrial America LLC, New Holland, PA (US)

(72) Inventors: Curtis Hillen, Lititz, PA (US); Nathan E. Isaac, Lancaster, PA (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 719 days.

(21) Appl. No.: 17/467,958

(22) Filed: Sep. 7, 2021

(65) Prior Publication Data

US 2023/0070987 A1 Mar. 9, 2023

(51) Int. Cl.
| | |
|---|---|
| *A01D 41/12* | (2006.01) |
| *A01B 69/00* | (2006.01) |
| *A01D 41/127* | (2006.01) |
| *A01D 41/16* | (2006.01) |

(52) U.S. Cl.
CPC .......... *A01D 41/127* (2013.01); *A01D 41/16* (2013.01)

(58) Field of Classification Search
CPC .... A01D 41/16; A01D 41/127; A01D 41/142; A01B 71/063
See application file for complete search history.

(56) References Cited

U.S. PATENT DOCUMENTS

| | | | |
|---|---|---|---|
| 5,832,705 | A | 11/1998 | Eis et al. |
| 6,519,923 | B1 | 2/2003 | Cooksey et al. |
| 6,735,929 | B2 | 5/2004 | Watts et al. |
| 8,322,122 | B2 | 12/2012 | Dold et al. |
| 9,137,946 | B2 | 9/2015 | Verhaeghe et al. |

(Continued)

FOREIGN PATENT DOCUMENTS

| | | |
|---|---|---|
| DE | 102014209218 A1 | 10/2015 |
| DE | 102013110688 B4 | 5/2019 |

(Continued)

OTHER PUBLICATIONS

Extended European Search Report for EP Application No. 22194194.1 dated Jan. 20, 2023 (six pages).

*Primary Examiner* — Thomas B Will
*Assistant Examiner* — Robert E Pezzuto
(74) *Attorney, Agent, or Firm* — Peter K. Zacharias; Rebecca L. Henkel; Rickard K. DeMille

(57) ABSTRACT

An embodiment includes a combine having a header with a motor driving a blade for harvesting crop, a power receiving connector connected to the motor, where the power receiving connector supplies power to drive the motor, and a mechanical connector. The combine also includes a feeder housing with an opening for receiving the harvested crop from the header, a power supplying connector connected to a power plant of the combine, and a mechanical actuator. A controller controls the combine by attaching the header to the feeder housing by lifting the header such that the power receiving connector and the power supplying connector are automatically mated, and such that the mechanical actuator and the mechanical connector are mated, and controlling the power plant to generate and supply electrical power or hydraulic power to the power supply connector, which is supplied to the motor of the header via the power receiving connector.

16 Claims, 5 Drawing Sheets

(56) References Cited

U.S. PATENT DOCUMENTS

| | | |
|---|---|---|
| 9,743,588 B2 | 8/2017 | Dreer et al. |
| 10,034,425 B2 | 7/2018 | Ducroquet et al. |
| 2008/0256914 A1* | 10/2008 | Ricketts ................ A01D 41/16 56/10.8 |
| 2008/0271425 A1 | 11/2008 | Ricketts et al. |
| 2018/0168102 A1* | 6/2018 | Saraiva ................ A01D 41/16 |
| 2020/0214200 A1 | 7/2020 | Karst et al. |
| 2020/0267888 A1 | 8/2020 | Putz |
| 2021/0037710 A1 | 2/2021 | Noll et al. |

FOREIGN PATENT DOCUMENTS

| | | |
|---|---|---|
| EP | 1987713 A1 | 11/2008 |
| GB | 2462129 A | 1/2010 |
| WO | 20150134055 A1 | 9/2015 |
| WO | 2021014254 A1 | 1/2021 |
| WO | 2021023402 A1 | 2/2021 |

* cited by examiner

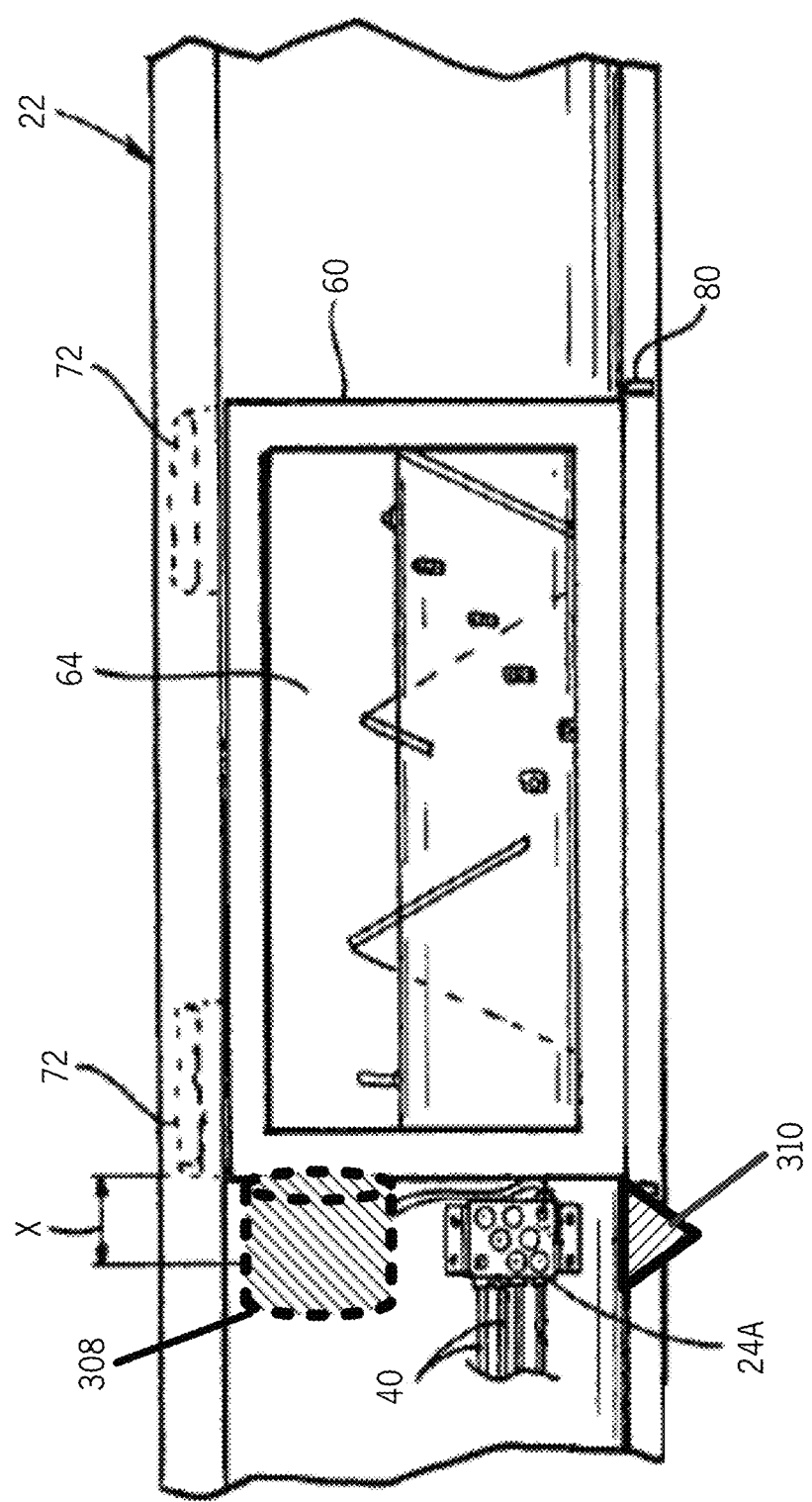

REMOTE AND AUTOMATIC CONNECTION AND DRIVE OF A COMBINE HEADER

The invention relates to remote and automatic connection and drive of a combine header.

BACKGROUND OF THE INVENTION

Agricultural Harvesters (i.e. combines) include various headers that are attached to a feeder housing in the front of the combine. In order to attach the header, operator drives the combine to position the feeder housing in proximity to the header. Then the operator must leave the combine cab to manually couple the mechanical drives, make electrical connections, make hydraulic connections, and mechanically latch the header to the combine. This results in lost time from the critical task of harvesting and transporting between fields. In addition, the operator must work in an area with moving parts that are hazardous.

SUMMARY OF THE INVENTION

An embodiment includes a combine having a header with at least one motor driving a blade for harvesting crop, at least one power receiving connector connected to the motor, where the at least one power receiving connector supplies power to drive the motor, and at least one mechanical connector. The combine also includes a feeder housing with an opening for receiving the harvested crop from the header, at least one power supplying connector connected to a power plant of the combine, and at least one mechanical actuator. Furthermore, the combine includes a controller that controls the combine by attaching the header to the feeder housing by controlling the combine to align the feeder housing with the header, controlling the feeder housing to lift the header such that the at least one power receiving connector and the at least one power supplying connector are automatically mated, and such that the at least one mechanical actuator and the at least one mechanical connector are mated, and controlling the power plant to generate and supply electrical power or hydraulic power to the at least one power supply connector, which is supplied to the at least one motor of the header via the at least one power receiving connector.

Another embodiment includes method for operating a combine including a header having at least one motor driving a blade for harvesting crop, at least one power receiving connector connected to the motor, the at least one power receiving connector supplying power to drive the motor, and at least one mechanical connector, the combine including a feeder housing having an opening for receiving the harvested crop from the header, at least one power supplying connector connected to a power plant of the combine, at least one mechanical actuator, and the combine including a controller that controls the combine. The method includes controlling, by the controller, the combine to align the feeder housing with the header, controlling, by the controller, the feeder housing to lift the header such that the at least one power receiving connector and the at least one power supplying connector are automatically mated, and such that at least one mechanical actuator and the at least one mechanical connector are mated, and controlling, by the controller, the power plant to generate and supply electrical power or hydraulic power to the at least one power supply connector, which is supplied to the at least one motor of the header via the at least one power receiving connector.

BRIEF DESCRIPTION OF THE FIGURES

FIG. 2 is another side view of the combine of FIG. 1 with the header connected to the feeder, according to an embodiment of the disclosure.

FIG. 6 is an enlarged schematic rear view of the header, according to an embodiment of the invention.

FIG. 7 is a view of the communication between the combine control system and an external network, according to an embodiment of the invention.

FIG. 8 is a flowchart for automatically connecting/disconnecting a combine header to/from the combine feeder, according to an embodiment of the invention.

DETAILED DESCRIPTION OF THE INVENTION

Figure 1:
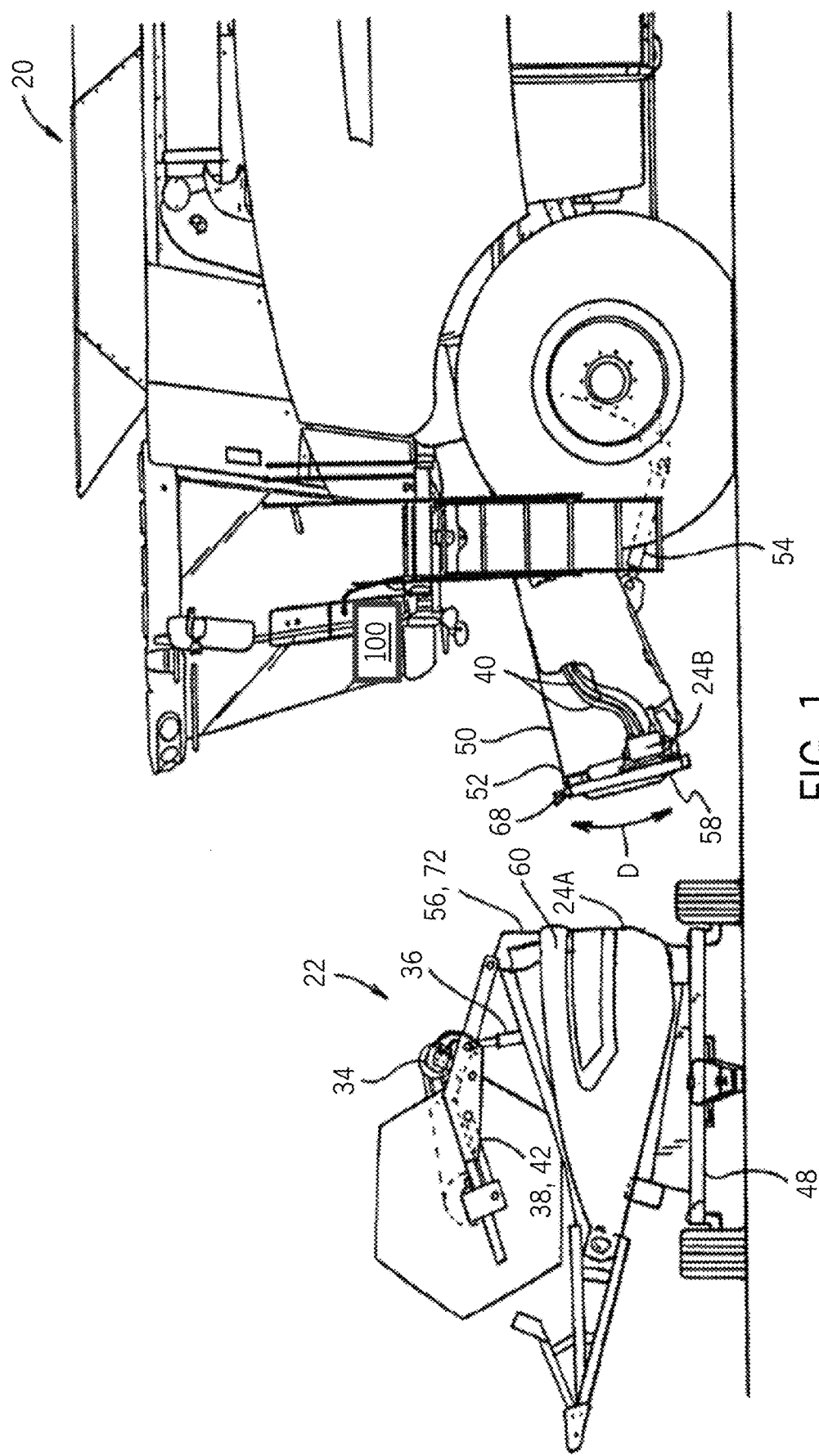
FIG. 1 is a side view of an agricultural combine and a header connectable thereto, according to an embodiment of the disclosure.

Reference now will be made in detail to embodiments of the invention, one or more examples of which are illustrated in the drawings. Each example is provided by way of explanation of the invention, not limitation of the invention. It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, and particularly to FIG. 1, a self-propelled agricultural combine 20, is illustrated in association with a header 22. Header 22 is connectable to feeder 50 of combine 20, via connection devices 24A/24B (and other devices shown in FIGS. 3 and 4) for automatically connecting fluid systems and/or electrical systems, respectively, thereof, during the connection of header 22 to feeder 50 without human intervention and without having to connect a mechanical drive of feeder 50 to a mechanical drive of header 22. Connection device 24 is also operable for automatically disconnecting the respective fluid and electrical systems, when header 22 is disconnected from feeder 50 without human intervention and without having to disconnect a mechanical drive of feeder 50 from a mechanical drive of header 22.

A combine controller 100 is also included in the combine. The combine controller may be a programmable logic controller, micro-controller, etc. The combine controller is programmable by the operator of the combine through a user (e.g. operator) interface, or through a remote computer (not shown). The operator, for example, enters commands through the user interface. In response to these commands, the controller sends control signals to the various actuators of combine 20. More details of combine controller 100 and interface are described with reference to FIGS. 7 and 8.

It should be appreciated that the configuration of the combine 20 described above and shown in FIG. 1 is provided only to place the present subject matter in an exemplary field of use. Thus, it should be appreciated that the present subject matter may be readily adaptable to any manner of combine configuration.

Referring now to FIG. 2, header 22 illustrated is of the variety known as a grain header, and is configured for harvesting small grains, such as, but not limited to, wheat, soybeans and other legumes, and rice, as combine 20 is moved in a forward direction, denoted by arrow F over an agricultural field. Header 22 is intended to be representative of a wide variety of different headers of various widths that can be used with a combine such as combine 20, such as, but not limited to, corn headers and specialty grain headers. Header 22 includes harvesting apparatus including an elongate, sideward extending sickle 26 (e.g. blade) reciprocating operable for severing crops from a field, and a reel 28 rotatable, as denoted by arrow A, for feeding the crops to sickle 26 and conveying the cut crops rearward onto a pan 30 of the header. Sickle 26 can be powered in any suitable manner, for instance, using a fluid motor which receives pressurized fluid from a pressurized fluid source, such as a pump, on combine 20; a PTO drive; or an electric motor.

The speed of rotation of reel 28 is continuously controllable during the harvest operation by an operator in operator cabin 32 via interface (not shown) of controller 100, and the reel will be controllably movable in upward, downward, forward and rearward directions as denoted by directional arrows B, for achieving desired crop harvesting characteristics. A representative motor 34 for rotatably driving reel 28, and a representative actuator 36 for controlling vertical position of the reel, are illustrated. Motor 34 and actuator 36 are constructed and operable as either electrical or hydraulic devices comprising elements of an electrical or fluid system of header 22, which elements will variously receive electrical power from a generator on combine 20 or receive pressurized fluid from the pump on combine 20 via electrical/hydraulic lines 40 (see also FIGS. 3 and 4), and which will be automatically coupled together by connection devices 24A/24B, when header 22 is connected to combine 20 as illustrated in FIGS. 2 and 4, as will be explained. Additional actuators for effecting forward and rearward movements of reel 28 are concealed by telescopically extendable reel support arms 38, and will also be connected via connection of associated electrical/hydraulic lines 40 of the header and combine.

The electrical system of the header may include devices sensors such as a speed sensor 42 associated with motor 34, various position sensors, and the like. The electrical devices of the electrical system will likewise be connected to corresponding systems of combine 20, via connection of connection devices 24A/24B, as will be explained.

Other devices and/or mechanisms of header 22 that can be powered via connection to combine 20 can include, but are not limited to, conveyor apparatus, illustrated by an auger 46 extending substantially the width of header 22, which is rotatable for conveying the harvested crops toward a center region of the header for passage through a discharge opening 64 thereof (FIG. 6), and a device (not shown) for providing identification or recognition of the header when connected to the combine.

Combine 20 also includes a feeder 50 operable for receiving harvested crops from a header, such as header 22, connected to a front end 52 of the feeder, and conveying the crops rearwardly and upwardly within the feeder, as denoted by arrow C in FIG. 2, to a threshing system (not shown) located within the combine. Feeder 50 is pivotally supported for upward and downward movement of front end 52, as denoted by arrows D (FIGS. 1 and 3), by a lift cylinder 54. Further details of combine 20, feeder 50 and header 22 are found in U.S. Publication 2008/0271425 which is incorporated by reference herein in its entirety and for all purposes.

It is noted that feeder 50 typically includes an existing mechanical drive 314 for supplying mechanical power, and header 22 typically includes existing mechanical drive 309 for receiving the mechanical power. In conventional combines, the operator manually couples mechanical drives 309 and 314 together with a long drive shaft. However, the present system avoids this manual mechanical connection and facilitates the automatic connection of header 22 to feeder 50 without human intervention. Specifically, the long drive shaft is replaced with a motor (e.g. electric, hydraulic, etc.) mounted to header 22 and a power plant (e.g. generator, pump) mounted to feeder 50 for powering the motor. In some embodiments, the present system makes use of the existing mechanical drives for connecting the motor and power plant. However, in other embodiments, the present system may avoid the use of mechanical drives. These details will now be described with referring to FIGS. 3 and 4.

Figure 3:
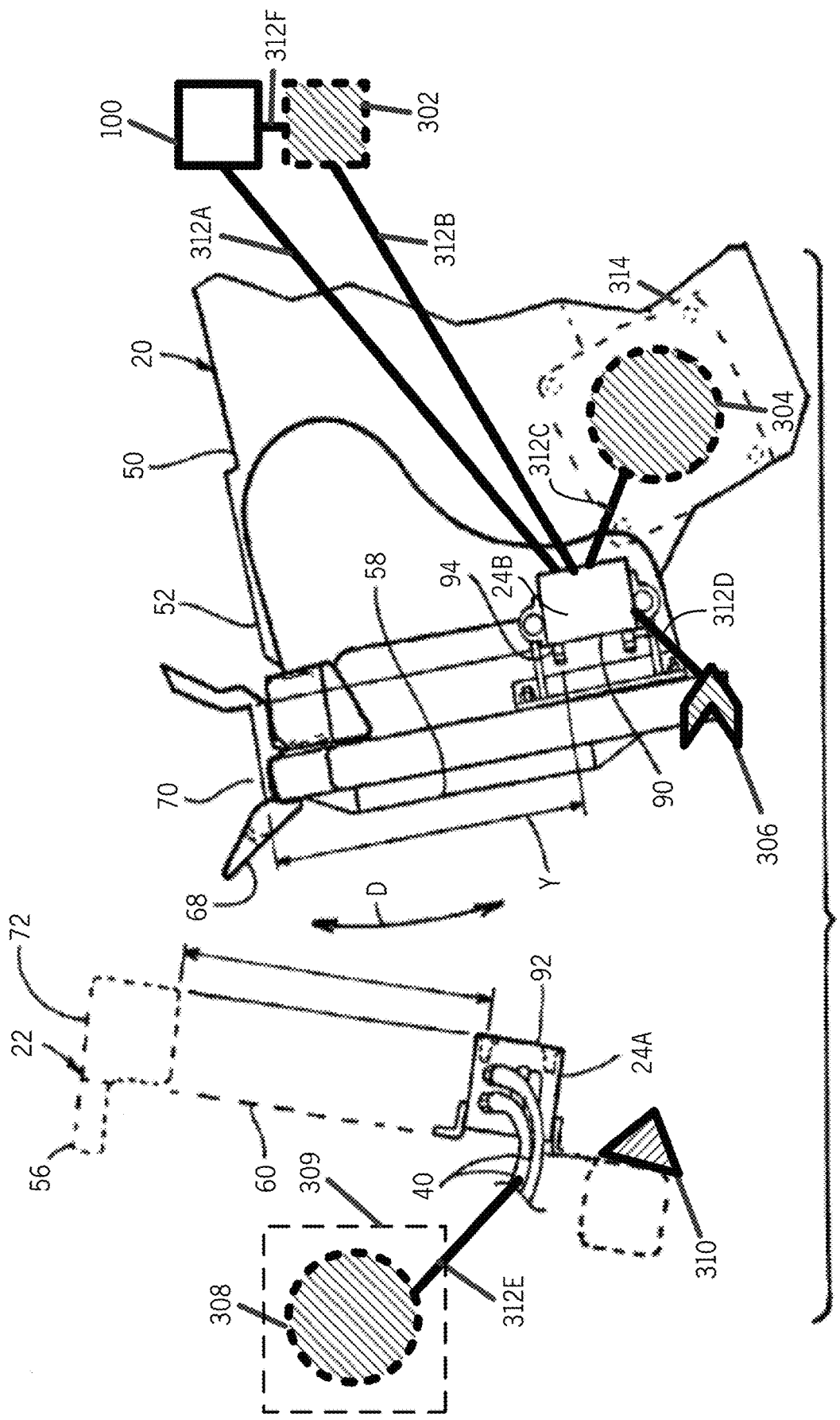
FIG. 3 is an enlarged side view of the feeder of the combine of FIGS. 1 and 2 oriented in a position for pivotal engagement, according to an embodiment of the disclosure.
Figure 4:
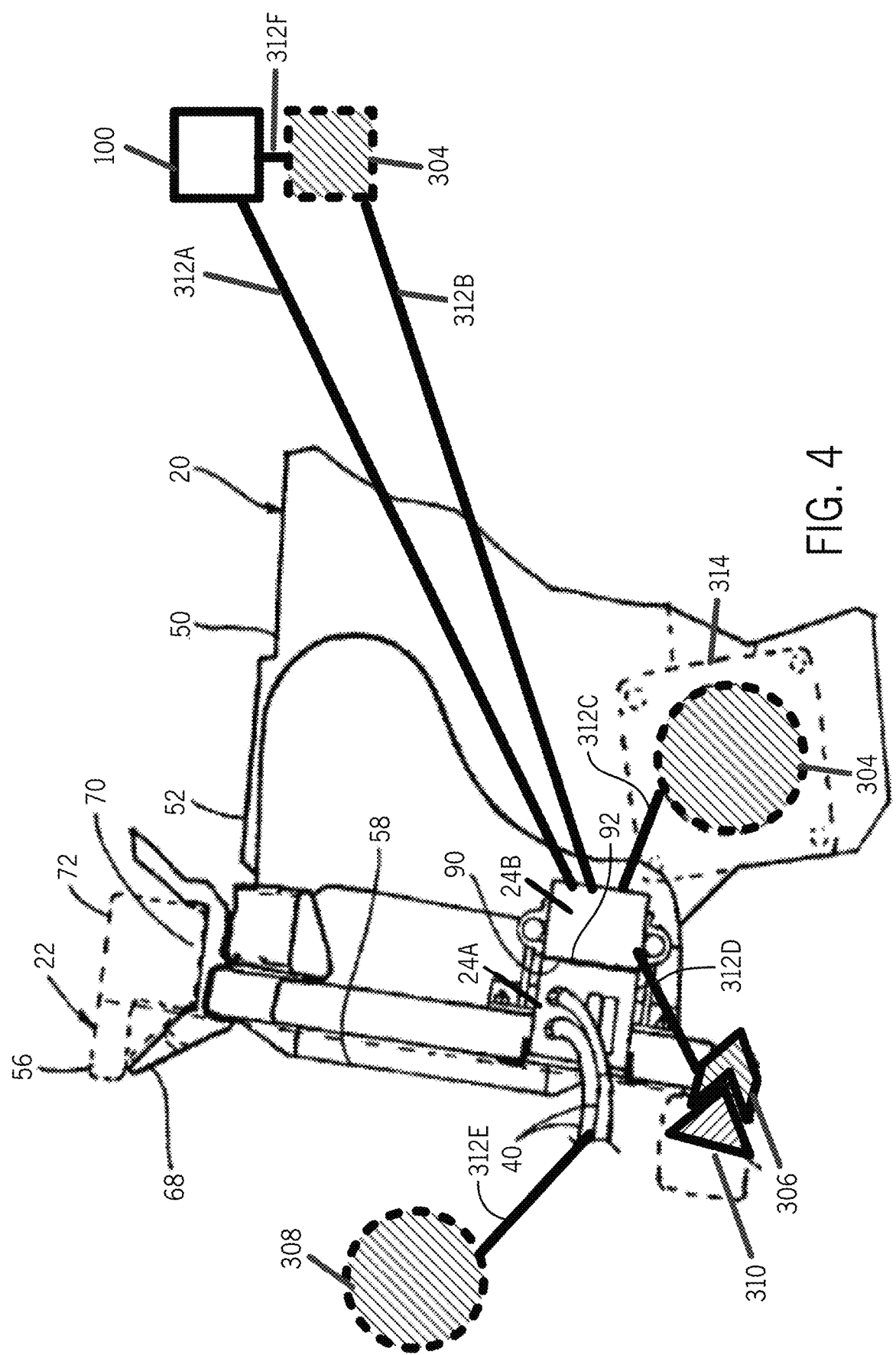
FIG. 4 is another side view of the feeder, showing engagement of the lifting elements for connection of the header, according to an embodiment of the invention.

As shown in FIG. 3, header 22 includes motor 308 which may be an electric motor or a hydraulic motor for driving auger 46 or other auger components. Motor 308 may be coupled (e.g. via belt, chain or direct axial connection) to existing mechanical drive 309 of header 22. Alternatively, motor 308 can drive header 22 without the use of existing mechanical drive 309. Motor 308 is either electrically or fluidly connected via lines 312E to connection device 24A mounted to the side of header 22. Connection device 24A may include male/female connectors on rearward facing surface 92 that mate with respective male/female connectors on forward facing surface 90 of connection device 24B that is mounted to the side of feeder 50. The physical mating of connection devices 24A/24B provides electrical and/or hydraulic fluid communication between the header and feeder.

Feeder 50 also includes power plant 304 which may be an electric generator or hydraulic pump. Power plant 304 may be coupled (e.g. via belt, chain or direct axial connection) to existing mechanical drive 314 of feeder 50. Alternatively, power plant 304 can be connected to feeder 50 without the use of existing mechanical drive 314. In general, power plant 304 is driven by a shaft rotated by a gear box (not shown) of mechanical drive 314 that is driven by the combine engine to produce and supply the electrical power and/or pressurized fluid to connection device 24B via lines 312C. In another example, power plant may be located elsewhere in the combine. Specifically, power plant 304 may be in the main combine housing behind the feeder and connected to controller 100 via control line 312F. Power plant 304 (generator/pump) may then produce and supply the electrical power and/or pressurized fluid to connection device 24B via lines 312B.

In either example, controller 100 may control power plant 302 and power plant 304 via control lines (e.g. 312A and 312F) or via the control of mechanical drives. Controller 100 may also send/receive signals to/from other electronic devices such as switches, sensors and the like (not shown) of header 22 and/or feeder 50 via electrical lines 312A. Electrical switches and/or hydraulic valves may also be included in power plant 304 or in connection device 24B to control flow of electrical power or pressurized hydraulic fluid to connection device 24A.

Aside from the electrical and/or hydraulic connections discussed above, an automatic mechanical latching connection is also made to ensure that header 22 is securely locked into place on feeder 50. In one example, feeder 50 and header 22 include respective mechanical latching devices 306/310 which lock together when mated. Device 310 may be a mechanical connector, and device 306 may be a mechanical actuator, or vice versa. For example, mechanical latching devices 306/310 may be an electromechanically spring loaded latch mechanism that automatically lock together when mated, and then unlock in response to a control signal from controller 100 sent via control lines 312A and 312D. In another example, mechanical latching devices 306/310 may be an electromagnetic latch mechanism that automatically lock together or unlock due to a magnetic field controlled in response to a control signal from controller 100. Other equivalent structures could also be utilized, as long as the header 22 is securely locked into place on feeder 50.

The process of connecting header 22 to feeder 50 is now described. As shown in FIG. 3, front end 52 of feeder 50 includes lifting elements 68 which are each preferably an upwardly open hook shaped member defining an elongate, receptacle 70 of rectangular or other suitable sectional shape. Rear end 56 of header 22 includes lifting elements 72 disposed adjacent to opposite sides of an upper end of rear interface structure 60, which lifting elements 72 preferably comprise sidewardly extending rectangular pins or rods which are cooperatively and pivotally engageable with lifting elements 68, so as to be receivable and positionable within respective receptacles 70 when header 22 is connected to feeder 50 and interface structures 58 and 60 are in the proper abutting relation.

Figure 5:
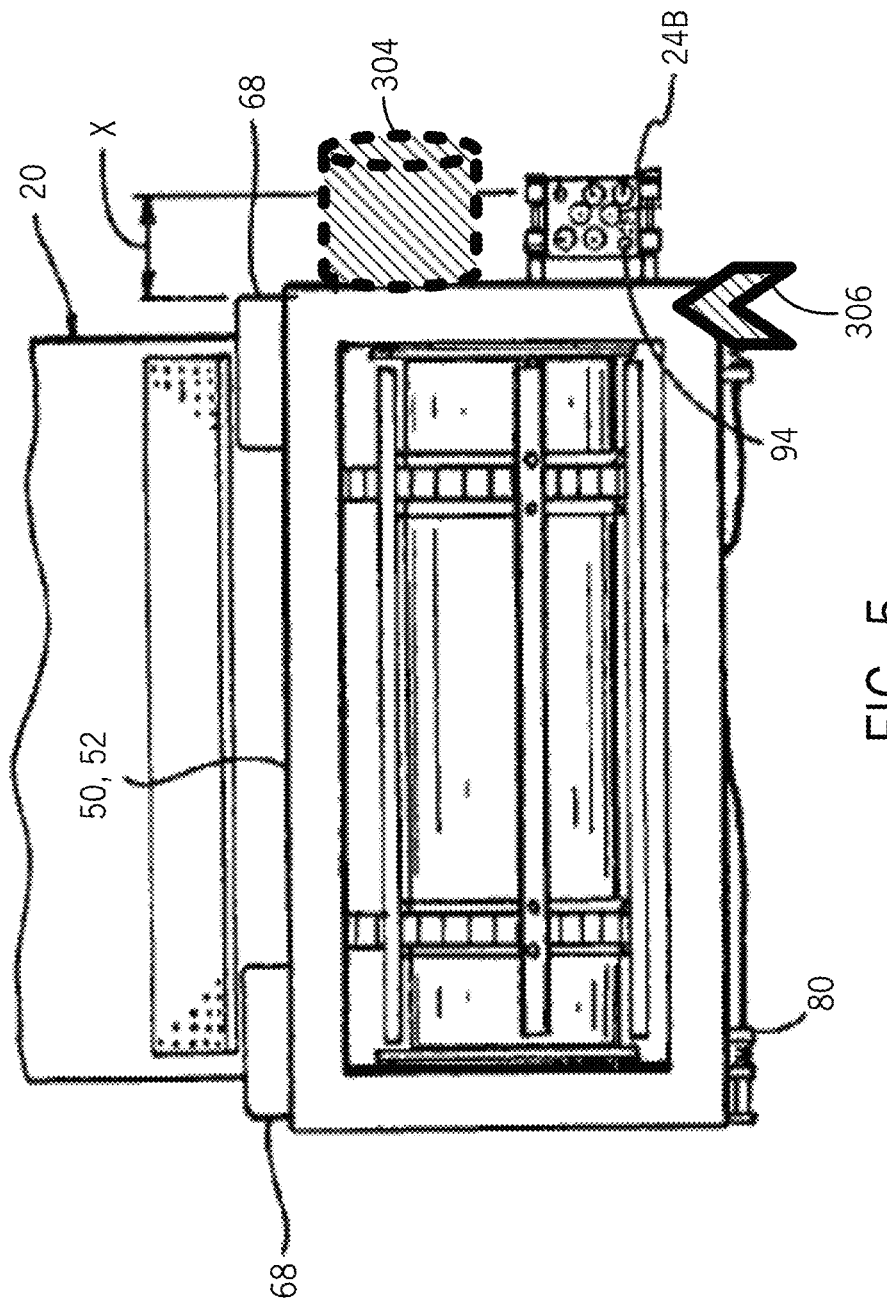
FIG. 5 is an enlarged schematic front view of the feeder, according to an embodiment of the invention.

In order to connect header 22 to feeder 50, the combine operator drives the combine to position receptacle 70 under lifting elements 72 (e.g. pivot bar). The combine operator then controls lift cylinder 54 to raise feeder 50, thereby pivotally mating position receptacle 70 with lifting elements 72 and raising header 22 off of the ground. Once header 22 is raised off of the ground, the bottom portion of header 22 swings (via gravity) towards feeder 50. Upon header 22 abutting feeder 50, connection devices 24A/24B automatically mate and mechanical latch mechanisms 306/310 automatically mate as shown in FIG. 4. Further details of the mating surfaces of header 22 and feeder 50 are shown in FIGS. 5 and 6 for clarity.

Note, that the combine operator does not have to exit the combine to make any connections. The electrical, hydraulic and mechanical connections are all made automatically when header 22 swings (via gravity) towards and abuts feeder 50. Once the mating is complete, the combine operator can drive away with the header and begin harvesting. Electrical power and/or hydraulic fluid for performing harvesting is communicated from feeder 50 to drive the various mechanisms of header 22. Feedback (e.g. sensor information) from header 22 can also be sent back to controller 100 for monitoring.

The process of disconnecting header 22 from feeder 50 is essentially the reverse process as described above. In order to disconnect header 22 from feeder 50, the combine controller sends a signal to mechanical latch mechanisms 306/310 to unlock the header and then controls lift cylinder to lower feeder 50. Once the feeder is lowered, the bottom portion of header 22 swings (via gravity) away from feeder 50 automatically disconnecting connection devices 24A/24B from one another. Once header 22 is resting on the ground, lift cylinder lowers feeder 50 even further such that position receptacle 70 is no longer mated with lifting elements 72. The combine operator can then drive away leaving the header 22 resting on the ground.

FIG. 7 shows an example of a system for controlling the combine. The system includes an interconnection between a control system 720 of combine 20, a remote PC 706 and a remote server 702 through network 700 (e.g. Internet). It should be noted that combine 20 does not have to be connected to other devices through a network. The controller of combine 20 can be a standalone system that receives operating instructions through a user interface, or through a removable memory device (e.g. Flash Drive).

Controller 710 may be configured to electronically control the operation of one or more components of the combine 20. In general, the controller 710 may comprise any suitable processor-based device known in the art, such as a computing device or any suitable combination of computing devices. Thus, in several embodiments, the controller 710 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 710 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 716 may generally be configured to store suitable computer-readable instructions that, when implemented by the processor(s), configure the controller 710 to perform various computer-implemented functions, such as one or more aspects of the methods described below with reference to FIG. 8 In addition, the controller 710 may also include various other suitable components, such as a communications circuit or module, one or more input/output channels, a data/control bus and/or the like.

Controller 710 is also coupled to header/feeder lock/release mechanisms 718 (e.g. latch 306), header/feeder motors/actuators 724 and header/feeder electrical generator and hydraulic pumps 726. In general, the coupling of controller 710 to feeder devices is facilitated through direct electrical and/or fluid connections. In contrast, coupling of controller 710 to header devices are facilitated through connection devices 24A/24B as shown in FIG. 4.

FIG. 8 is a flowchart for automatically connecting to and controlling a combine header. In step 800, the combine operator drives the combine to position receptacle 70 under lifting elements 72. In step 802, the combine operator then controls lift cylinder 54 to raise feeder 50, thereby pivotally mating position receptacle 70 with lifting elements 72 and raising header 22 off of the ground. In step 804, once header 22 is raised off of the ground, the bottom portion of header 22 swings (via gravity) towards feeder 50. Upon header 22 abutting feeder 50, connection devices 24A/24B automatically mate and mechanical latch mechanisms 306/310 automatically mate. In embodiments where mechanical latch mechanisms 306/310 (e.g. spring loaded mechanism) automatically lock header in place, step 806 can be skipped. However, in embodiments where mechanical latch mechanisms 306/310 require positive control to lock header in place, the controller sends a control signal to mechanical latch mechanisms 306/310 to lock the header in place. In step 808, controller then controls power plant 304 or switches/values in connection device 24B to send electrical power signals and/or hydraulic fluid to the header motors and/or actuators to perform harvesting. When harvesting is finished and the operator wants to release the header as determined in step 810, the controller, in step 812 sends a control signal to mechanical latch mechanisms 306/310 to unlock the header. In step 814, the combine operator then controls lift cylinder 54 to lower feeder 50. Once the feeder is lowered, the bottom portion of header 22 swings (via gravity) away from feeder 50 automatically disconnecting connection devices 24A/24B. In step 816, once header 22 is resting on the ground, lift cylinder lowers feeder 50 even further such that position receptacle 70 is no longer mated with lifting elements 72. The combine operator can then drive away leaving the header 22 resting on the ground.

Steps 800-816 of FIG. 8 are performed by controller 710 upon loading and executing software code or instructions which are tangibly stored on a tangible computer readable medium 716, such as on a magnetic medium, e.g., a computer hard drive, an optical medium, e.g., an optical disc, solid-state memory, e.g., flash memory, or other storage media known in the art. Thus, any of the functionality performed by the controller 710 described herein, such as the steps shown in of FIG. 8 are implemented in software code or instructions which are tangibly stored on a tangible computer readable medium. Upon loading and executing such software code or instructions by the controller 710, the controller 710 may perform any of the functionality of the controller 710 described herein, including the steps shown in of FIG. 8 described herein.

It is to be understood that the operational steps are performed by the controller 710 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 710 described herein is implemented in software code or instructions which are tangibly stored on a tangible computer readable medium. Upon loading and executing such software code or instructions by the controller 710, the controller 710 may perform any of the functionality of the controller 710 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   (a) a header including:
      (i) at least one motor driving one or more header components,
      (ii) at least one power receiving connector connected to the motor, the at least one power receiving connector supplying power to drive the motor, and
      (iii) at least one mechanical connector,
   (b) a feeder including:
      (i) an opening for receiving the harvested crop from the header,
      (ii) at least one power supplying connector connected to a power plant of the combine, wherein the at least one power supplying connector and the at least one power receiving connector are configured to be automatically mated when the header is lifted by the feeder,
      (iii) at least one mechanical actuator wherein the at least one mechanical actuator and the at least one mechanical connector are configured to be automatically mated when the header is lifted by the feeder, and
      (iv) a power plant in the form of a generator or a pump driven by a mechanical drive of the feeder; and
   (c) a controller configured to control the power plant to generate and supply electrical power or hydraulic power to the at least one power supplying connector, which is supplied to the at least one motor of the header via the at least one power receiving connector.

2. The combine of claim 1,
   wherein the controller controls the at least one mechanical actuator to lock onto the at least one mechanical connector, such that the header is locked into place on the feeder.

3. The combine of claim 1,
   wherein the header further comprises a mechanical pivot bar, and
   wherein the controller is further configured to control the feeder to lift the header from the mechanical pivot bar such that the header pivots towards the feeder to automatically mate the at least one power receiving connector and the at least one power supplying connector.

4. The combine of claim 1,
   wherein the controller is further configured to release the header from the feeder by:
   controlling the at least one mechanical actuator to unlock from the at least one mechanical connector, such that the header is free to be released from the feeder,
   controlling the feeder to lower the header onto the ground, and
   controlling the combine to drive away from the header such that the at least one power receiving connector and the at least one power supplying connector are automatically unmated.

5. The combine of claim 4,
   wherein the header further comprises a mechanical pivot bar, and
   wherein the controller is further configured to control the feeder to lower the header by the mechanical pivot bar such that the header pivots away from the feeder such that the at least one power receiving connector and the at least one power supplying connector are automatically unmated.

6. The combine of claim 1,
wherein the at least one power receiving connector is mounted to the outer surface of the header and extends beyond a mating surface of the header, and
wherein the at least one power supplying connector is mounted to the outer surface of the feeder and extends beyond a mating surface of the feeder.

7. The combine of claim 1,
wherein the controller is further configured to control the power supplied to drive the motor according to at least one of an operator preference, a predetermined setting, or a type of crop being harvested.

8. The combine of claim 1,
wherein the controller is further configured to control the power supplied to drive the motor to control at least one of a speed of an auger of the header, or an angle of a sickle bar of the header.

9. A method for operating a combine including a header having at least one motor driving one or more header components, at least one power receiving connector connected to the motor, the at least one power receiving connector supplying power to drive the motor, and at least one mechanical connector, the combine including a feeder having an opening for receiving the harvested crop from the header, at least one power supplying connector connected to a power plant of the combine, at least one mechanical actuator, and a power plant in the form of a generator or a pump, and the combine including a controller, the method comprising:
controlling, by the controller, the combine to align the feeder with the header;
controlling, by the controller, the feeder to lift the header such that the at least one power receiving connector and the at least one power supplying connector automatically become mated, and such that at least one mechanical actuator and the at least one mechanical connector automatically become mated;
driving the power plant by a mechanical drive of the feeder; and
controlling, by the controller, the power plant to generate and supply electrical power or hydraulic power to the at least one power supply connector, which is supplied to the at least one motor of the header via the at least one power receiving connector.

10. The method claim 9, further comprising:
controlling, by the controller, the at least one mechanical actuator to lock onto the at least one mechanical connector, such that the header is locked into place on the feeder.

11. The method of claim 9, further comprising:
controlling, by the controller, the feeder to lift the header from a mechanical pivot bar of the header such that the header pivots towards the feeder to automatically mate the at least one power receiving connector and the at least one power supplying connector.

12. The method of claim 9, further comprising:
controlling, by the controller, the at least one mechanical actuator to unlock from the at least one mechanical connector, such that the header is free to be released from the feeder,
controlling, by the controller, the feeder to lower the header onto the ground, and
controlling, by the controller, the combine to drive away from the header such that the at least one power receiving connector and the at least one power supplying connector are automatically unmated.

13. The method of claim 12, further comprising:
controlling, by the controller, the feeder to lower the header by a mechanical pivot bar of the header, such that the header pivots away from the feeder such that the at least one power receiving connector and the at least one power supplying connector are automatically unmated.

14. The method of claim 9, further comprising:
controlling, by the controller, the at least one mechanical actuator to pull the header against the feeder.

15. The method of claim 9, further comprising:
controlling, by the controller, the power supplied to drive the motor according to at least one of an operator preference, a predetermined setting, or a type of crop being harvested.

16. The method of claim 9, further comprising:
controlling, by the controller, the power supplied to drive the motor to control at least one of a speed of an auger of the header, or an angle of a sickle bar of the header.

\* \* \* \* \*